United States Patent
Phadke et al.

(10) Patent No.: US 7,262,980 B2
(45) Date of Patent: Aug. 28, 2007

(54) METHOD AND APPARATUS FOR REDUCING BODY DIODE CONDUCTION OF SYNCHRONOUS RECTIFIERS

(75) Inventors: Vijay Gangadhar Phadke, Pasig (PH); Arlaindo Vitug Asuncion, Paranaque (PH); Richard Daniel Cabbab Caubang, Quezon (PH)

(73) Assignee: Astec International Limited (CN)

( * ) Notice: Subject to any disclaimer, the term of this patent is extended or adjusted under 35 U.S.C. 154(b) by 165 days.

(21) Appl. No.: 11/002,426

(22) Filed: Dec. 2, 2004

(65) Prior Publication Data

US 2006/0120123 A1 Jun. 8, 2006

(51) Int. Cl.
*H02M 5/42* (2006.01)

(52) U.S. Cl. .................................. 363/89; 363/127

(58) Field of Classification Search ................ 363/127, 363/89, 21.06, 21.14
See application file for complete search history.

(56) References Cited

U.S. PATENT DOCUMENTS

| | | | |
|---|---|---|---|
| 6,490,179 B1 * | 12/2002 | Boylan et al. | 363/21.06 |
| 6,504,739 B2 | 1/2003 | Phadke | |
| 6,535,400 B2 * | 3/2003 | Bridge | 363/21.06 |

* cited by examiner

*Primary Examiner*—Shawn Riley
(74) *Attorney, Agent, or Firm*—Harness, Dickey & Pierce, P.L.C.

(57) ABSTRACT

A circuit for controlling the operation of synchronous rectifiers. The circuit delays the turn-off of the synchronous rectifiers in accordance with the load current. The magnitude of the load current is examined to determine which of a plurality of delay elements is selected to delay turn-off of the synchronous rectifiers. Delay is accomplished by holding up for a predetermined time period one of a plurality of control signals utilized to determine when the synchronous rectifier should be turned-off.

7 Claims, 15 Drawing Sheets

METHOD AND APPARATUS FOR REDUCING BODY DIODE CONDUCTION OF SYNCHRONOUS RECTIFIERS

FIELD OF THE INVENTION

The present invention relates generally to switching power supplies, and, more particularly, to a control circuit for synchronous rectifiers.

BACKGROUND OF THE INVENTION

Manufacturers of electronic components increasingly demand switching power converters that have a very low voltage loss and a high output current. One type of a switching power converter uses a synchronous rectification technique. Synchronous rectifiers typically are implemented as metal-oxide semiconductor field-effect transistors (MOSFETs), although other switches such as bipolar junction transistors (BJTs), insulated-gate field-effect transistors (IGBTs), or other switches may be used. Synchronous rectification improves the efficiency of a power converter by substituting a transistor for a rectifier diode. This type of switching power converter is generally formed by a switching circuit, a transformer, a rectifying circuit, and at least one control circuit.

The switching circuit typically includes a bridge circuit arranged in a push-pull configuration with a transformer. For example, four switching devices (switches) may define the bridge circuit. The first and second switches are connected in series. The third and a fourth switches are also connected in series, and the series pairs are connected in parallel across a direct current (DC) voltage source. The transformer, which has a primary winding and a secondary winding, connects to the first and the second switches at one end of the primary winding. The other end of the primary winding connects to the third and the fourth switches. A rectifying circuit including two synchronous rectifiers connects to the secondary side of the transformer. A primary control circuit connects to the switching circuit. The primary control circuit generates a drive signal for each of the switches.

A secondary control circuit drives the synchronous rectifiers in accordance with drive signals output by the primary control circuit. In one configuration, the secondary control circuit includes two logical OR gates. The drive signals used to control the first and fourth switches define inputs to the first logical OR gate. The first logical OR gate outputs a drive signal to one of the two synchronous rectifiers. The drive signals used to control the second and third switches define inputs to the second logical OR gate. The second logical OR gate outputs a drive signal to the other of the two synchronous rectifiers. An example of such a configuration may be seen with respect to U.S. Pat. No. 6,504,739 issued Jan. 7, 2003, and assigned to the assignee of the present invention, the disclosure of which is incorporated by reference in its entirety herein.

While the switching power converter described above has a low voltage loss and a high current output, it may not address all of the parasitic components that potentially exist in a synchronous rectifier circuit. For example, a zero phase shifted full bridge, zero voltage switching (ZVS) converter includes transformer leakage inductance. Transformer leakage inductance causes a delay in the actual voltage of the secondary winding relative to the voltage across the primary winding. It may also increase the time necessary for the drain current passing through the synchronous rectifier to deplete to zero with respect to the primary winding voltage. This voltage and current delay increases as the load current increases. When the synchronous rectifiers turn off, the drain current through the MOSFET transfers to the body diode of the MOSFET, thereby increasing the voltage drop across the MOSFET. These conduction losses are higher than if the drain current was able to pass through a drain-to-source on-resistance.

SUMMARY OF THE INVENTION

The present invention is directed to circuit including a secondary controller and a delay circuit coupled to the secondary controller. The delay circuit receives a first synchronous rectifier control signal from the secondary controller and a load current signal. The delay circuit applies a predetermined delay to the first synchronous rectifier control signal. A synchronous rectifier control circuit is coupled to the secondary controller and to the delay circuit. The synchronous rectifier control circuit receives the delayed first synchronous rectifier control signal and controls a synchronous rectifier in accordance with the first synchronous rectifier control signal. The delay applied to the first synchronous rectifier control signal varies in accordance with the load current signal.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
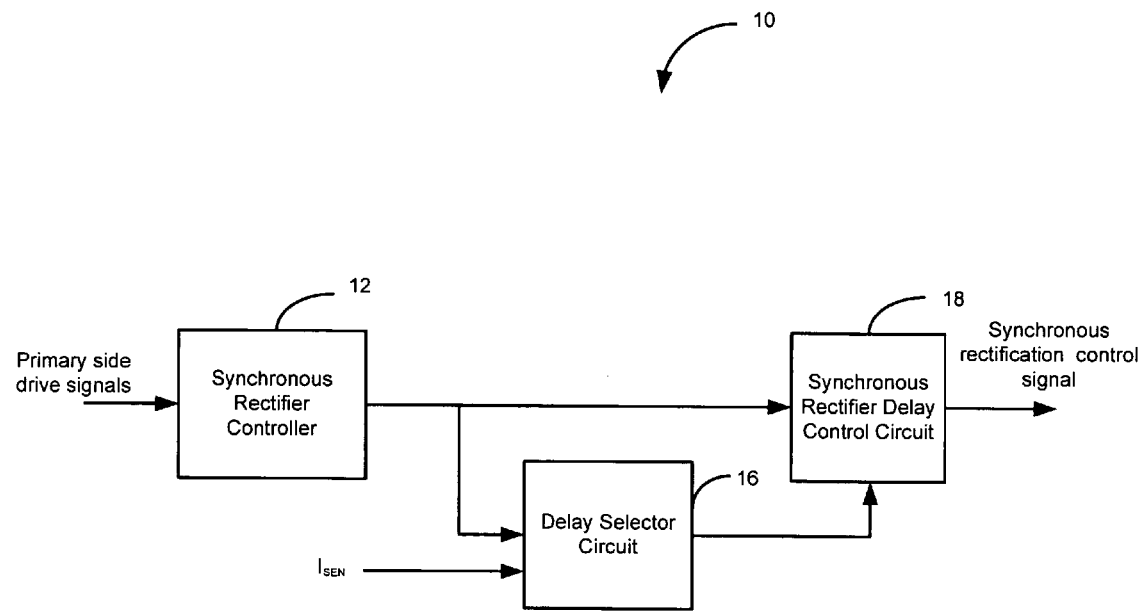
FIG. 1 is a schematic diagram of a synchronous rectifier control circuit for synchronous rectification in accordance with the present invention.

The following description of the preferred embodiments is merely exemplary in nature and is in no way intended to limit the invention, its application, or uses. For purposes of clarity, similar reference numbers are used in the drawings to identify similar elements.

The present invention increases the efficiency of power converters by reducing the body diode conduction due to transformer leakage inductance. This is accomplished by optimizing control of the synchronous rectifier relative to the output load current. For example, turning a synchronous rectifier to an off state is delayed until the drain current is nearly zero in the synchronous rectifier. This reduces body diode conduction through the synchronous rectifier. Moreover, the cost to manufacture a switching power converter is reduced since lower performing components may replace more expensive components while still attaining power efficiency requirements.

Although the following description generally relates to a full bridge converter, it is readily understood that the broader aspects of the present invention are applicable to other types of converter topologies (e.g. push-pull topologies, half bridge topologies, etc.) that use synchronous rectification. In particular, the present invention may be applied to soft switched full bridge, full bridge, forward half bridge, and flyback converters that use synchronous rectification.

FIG. 1 depicts a block diagram of a synchronous rectifier control circuit 10 for delaying a signal to turn off a synchronous rectifier. Synchronous rectifier control circuit 10 includes synchronous rectifier controller 12, delay selector circuit 16, and synchronous rectifier delay control circuit 18.

Primary side drive signals enter synchronous rectifier controller 12 from a primary control circuit (not shown). Synchronous rectifier controller 12 controls the application of the primary side drive signals to synchronous rectifier delay control circuit 18 and to delay selector circuit 16. A load current signal ($I_{SEN}$), which depends upon the magnitude of a load current $I_{LOAD}$, is input to delay selector circuit 16. Based upon $I_{LOAD}$, delay selector circuit 16 determines the desired delay. A delay signal is then output from delay selector circuit 16 to synchronous rectifier delay control circuit 18. Synchronous rectifier delay control circuit 18 then generates a control signal to turn off a selected synchronous rectifier.

Figure 2:
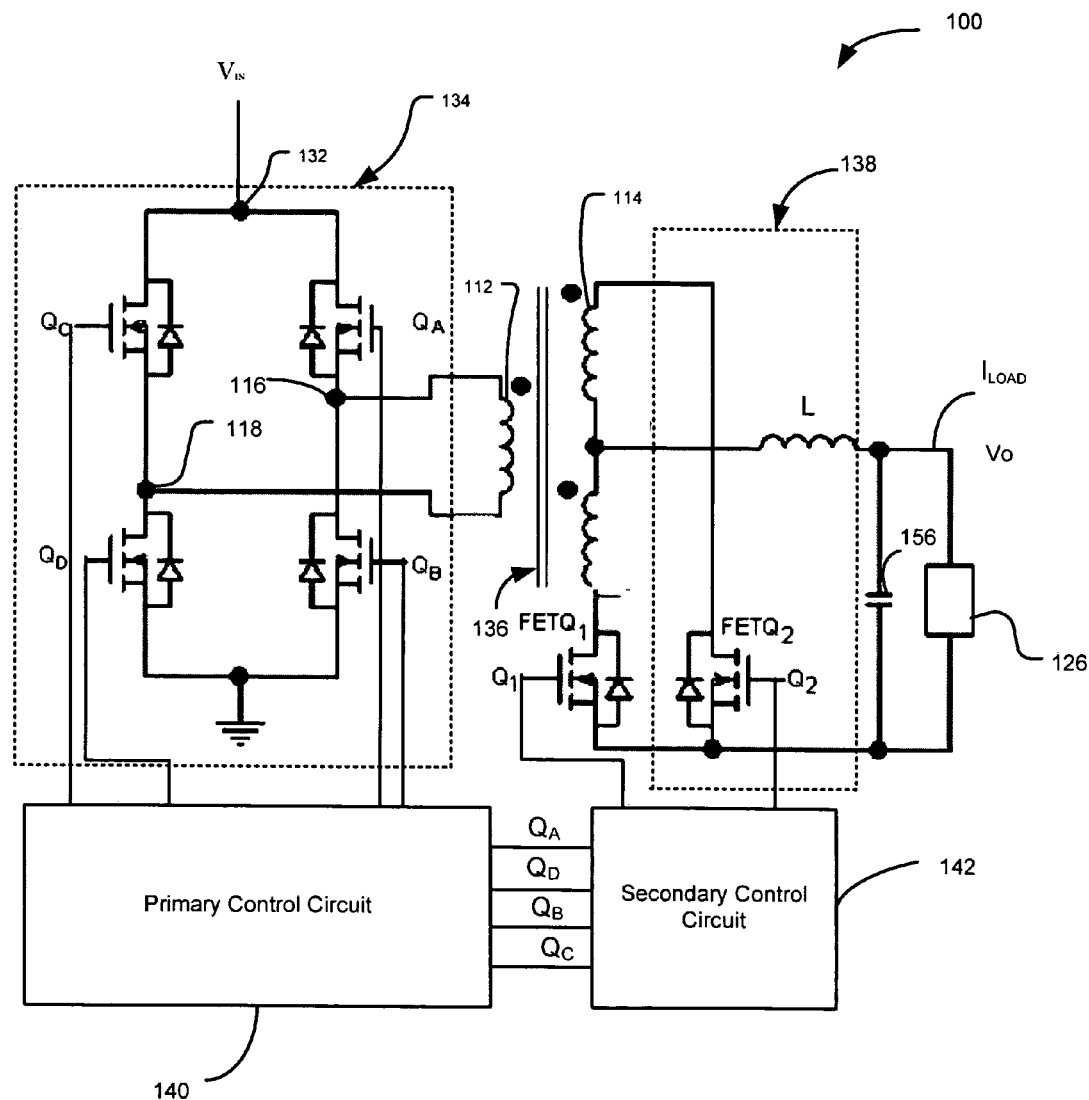
FIG. 2 is a schematic diagram of a switching power converter in accordance with one embodiment of the present invention.

FIG. 2 is a detailed embodiment of a zero phase shifted full bridge, zero voltage switching (ZVS) power converter 100. Power converter 100 comprises input voltage source 132 ($V_{IN}$), switching circuit 134, transformer 136, rectifying circuit 138, primary control circuit 140, secondary control circuit 142.

Switching circuit 134 includes a first switching device (switch) $Q_A$ connected in series to a second switch $Q_B$ to form a first switching leg. Switching circuit 134 also includes a third switch $Q_C$ connected in series to a fourth switch $Q_D$ to form a second switching leg. The switching legs are connected in parallel across input voltage source 132. In one embodiment, one or more of the primary switches are metal-oxide semiconductor field-effect transistors (MOSFETs) switches, although one skilled in the art will recognize that bipolar junction transistor (BJTs), insulated-gate field-effect transistors (IGBTs) or other suitable switches may also be used. Switching circuit 134 connects to transformer 136, which includes a primary side having primary winding 112 and a secondary side including secondary winding 114. One end of primary winding 112 connects to first node 116, and the other end of the primary winding 112 connects to second node 118.

Primary control circuit 140 generates drive signals for each of the switches $Q_A$, $Q_B$, $Q_C$, and $Q_D$ of switching circuit 134. In one configuration, primary control circuit 140 generates drive signals of various phases to the $Q_A/Q_D$ pair of switches and drive signals of various phases to the $Q_C/Q_B$ pair of switches. The control signals to switch pair $Q_A/Q_D$ are generally complementary to control signals to switch pair $Q_C/Q_B$. This allows diagonal switches (i.e., $Q_A/Q_D$ and $Q_C/Q_B$) to conduct alternately to effect a push-pull configuration across primary winding 112. Thus, primary control circuit 140 provides ZVS, phase shifted control over switching circuit 134.

Rectifying circuit 138 includes two synchronous rectifiers connected to a center-tapped secondary winding 114 of transformer 136. A first rectifying switch FETQ1 (also referred to as first synchronous rectifier) connects to a first end of secondary winding 114, and a second rectifying switch FETQ2 (also referred to as second synchronous rectifier) connects to the other end of secondary winding 114. An inductor L connects between a center tap of secondary winding 114 and an output terminal providing an output voltage $V_0$ to a load 126 in parallel with capacitor 156.

Secondary control circuit 142 connects to switches FETQ1 and FETQ2 of the rectifying circuit 138. Control signals $Q_A$, $Q_B$, $Q_C$, $Q_D$ from primary control circuit 140 provide input signals to secondary control circuit 142 to activate and to deactivate synchronous rectifiers FETQ1, FETQ2. In a conventional drive configuration, when a first pair of diagonal switches on the primary side of transformer 136 are both conducting, one of the two synchronous rectifiers FETQ1, FETQ2 is typically in an on state. After both of the first pair of diagonal switches is driven to an off state by primary control circuit 140, secondary control circuit 142 drives the one of the two synchronous rectifiers FETQ1, FETQ2 to an off state. In an embodiment of the present invention, secondary control circuit 142 delays turn off of the control signal for the second switch of a diagonal pair to correspondingly delay turn off of the associated synchronous rectifier. More specifically, the synchronous rectifier control signal that controls the later switch to be turned off of the switch pairs $Q_A/Q_D$ and $Q_C/Q_B$ is delayed by secondary control circuit 142. As described herein, active refers to active high.

FIGS. 3A-3D depict secondary control circuit 142 of FIG. 2 which includes a delay selection section 162 and delay element section 164. Except where noted, delay element section 164 includes substantially identical halves a and b, and like elements are referred to using like reference numerals having suffixes a and b. Generally, the amount of delay to turn off a synchronous rectifier depends on the delay elements operating in delay element section 164. Delay selection section 162 determines the delay elements operating in the delay element section 164.

Figure 3A:
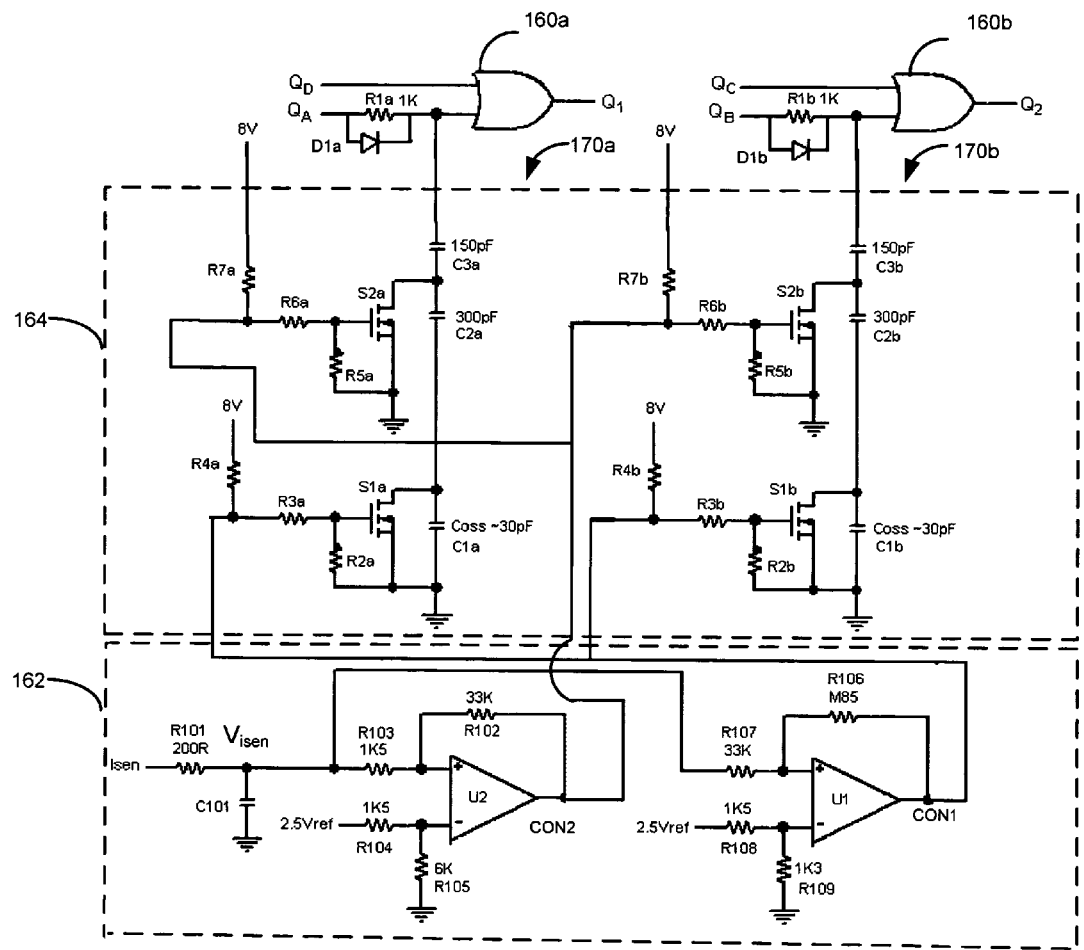
FIGS. 3A-3D are schematic diagrams of a secondary control circuit for the power converter of FIG. 2.
Figure 12:
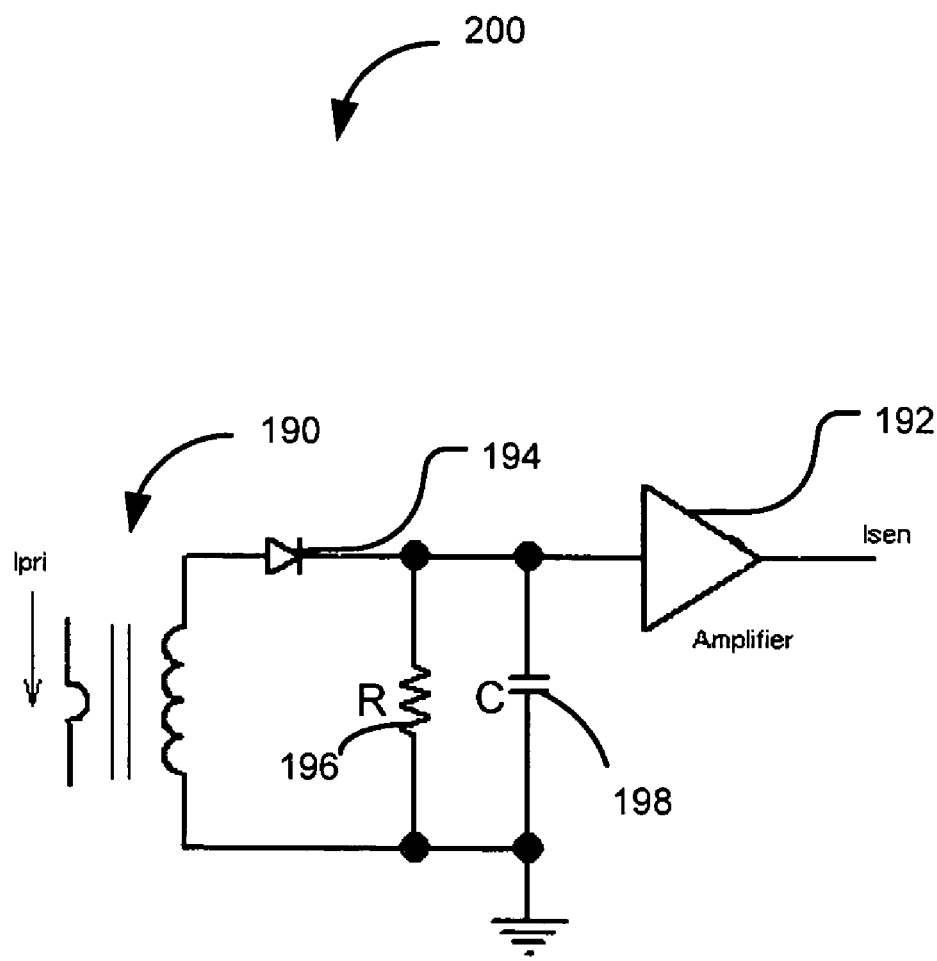
FIG. 12 is a block diagram of a current sensing circuit for providing the current sense signal of FIGS. 3A-3D.

Delay selection section 162 selects the delay element to operate in the delay element section 164 based on the magnitude of the load current flowing through the load 126 of FIG. 2. Referring to FIG. 3A, $I_{SEN}$ is determined based upon $I_{LOAD}$ using a conventional current sensing circuit 200 as shown in FIG. 12, as will be described in greater detail herein. $I_{SEN}$ passes through resistor R101, and a capacitor C101 provides low pass filtering. The voltage at the anode of capacitor C101 is referred to as $V_{ISEN}$.

The $V_{ISEN}$ voltage is applied to comparators U2 and U1 via respective resistors R103 and R107. Resistors R104 and R105 form a voltage divider for a reference voltage $V_{REF}$ to provide a reference voltage applied to the inverting input of comparator U2. The output signal CON2 is determined by comparing the voltage at the inverting input to the voltage at the non-inverting input of comparator U2. When the voltage at the non-inverting input exceeds the voltage at the inverting input, CON2 is high. If the voltage at the non-inverting input is less than the voltage at the inverting input, CON2 is low. A feedback resistor R102 provides hysteresis at the non-inverting input.

The output signal CON1 from comparator U1 is similarly determined. Resistors R108 and R109 form a voltage divider for a reference voltage $V_{REF}$ to provide a reference voltage applied to the inverting input of comparator U1. The output signal CON1 is determined by comparing the voltage at the inverting input to the voltage at the non-inverting input of comparator U2. If the voltage at the non-inverting input is less than the voltage at the inverting input, CON1 is low. If the voltage at the non-inverting input exceeds the voltage at the inverting input, CON1 is high. A feedback resistor R106 provides hysteresis at the non-inverting input of comparator U1. CON1 and CON2 are applied to the delay element section 164.

Delay element section 164 includes first and second delay circuits 170a, 170b. First delay circuit 170a will be described herein. One skilled in the art will recognize that second delay circuit 170b operates similarly. First delay circuit 170a connects to an input of a first OR gate 160a. Drive signal $Q_A$ connects to the input of first OR gate 160a through a parallel connection of resistor R1a and D1a of first delay circuit 170a. Drive signal $Q_D$ connects to the other input of the first OR gate 160a. First OR gate 160a outputs a drive signal to the synchronous rectifier $FETQ_1$. As will be described in greater detail herein, activating CON1 and/or CON2 correspondingly activates respective switches S1a and S2a to selectively introduce varying capacitances between the $Q_A$ input of OR gate 160a and ground.

The CON1 output of comparator U1 connects to a voltage divider that includes resistors R4a, R3a, and R2a. One terminal of resistor R4a connects to an 8 volt source and the other terminal of resistor R4a connects to resistor R3a. One node of the voltage divider connects to the gate of switch S1a. Switch S1a includes a capacitance Coss across its drain and source, which connects to ground. The capacitance Coss may be the small output capacitance of switch S1a, or it may be an external capacitance.

Similarly, CON2 connects to a voltage divider that includes resistors R7a, R6a, and R5a. One terminal of resistor R7a connects to an 8 volt source, and the other terminal of resistor R7a connects to resistor R6a. The drain of switch S2a connects to a node interconnecting capacitors C2a and C3a to provide a path from the interconnecting terminal of C3a, through switch S2a, to ground.

Figure 3B:
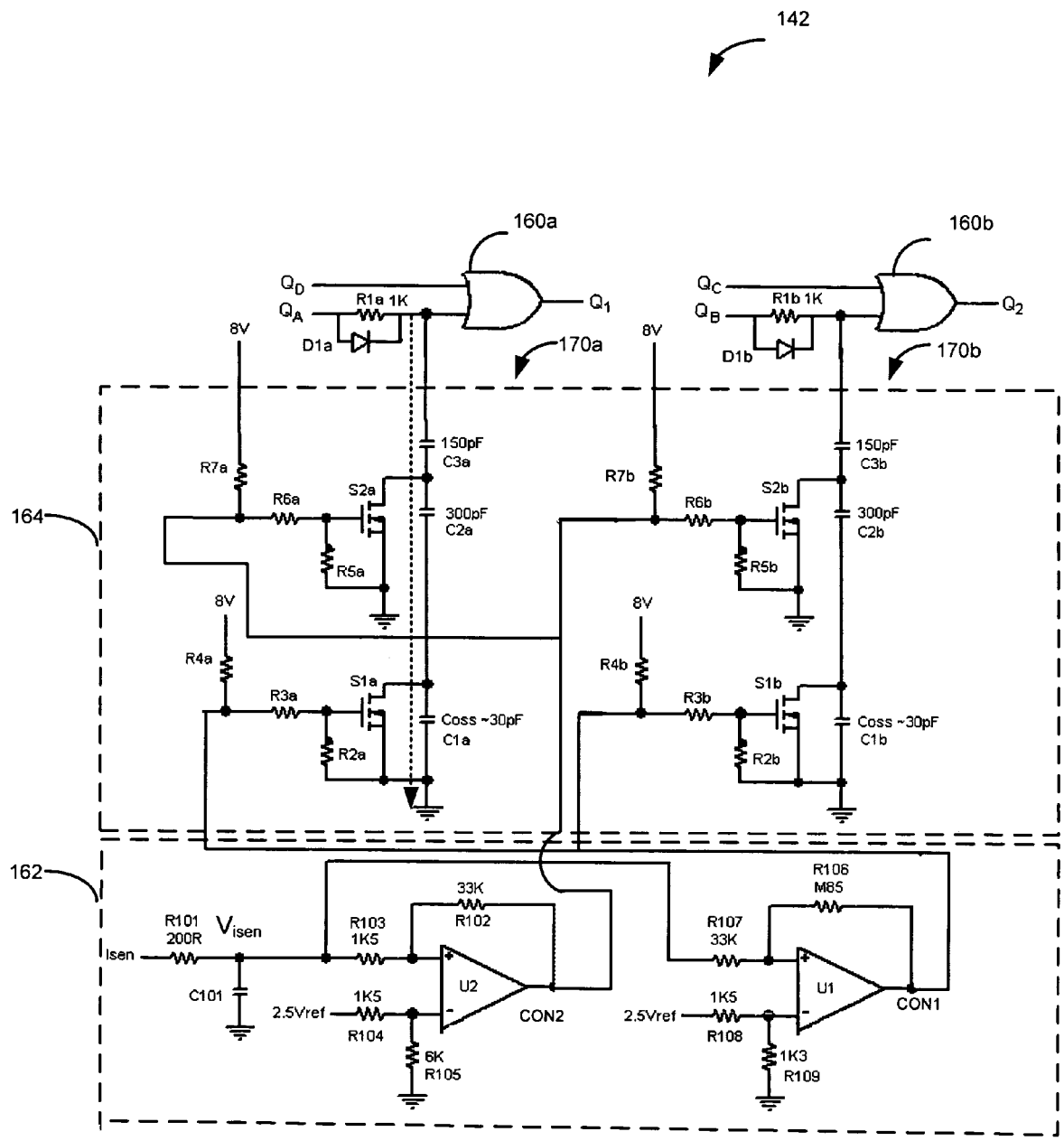
Figure 3C:
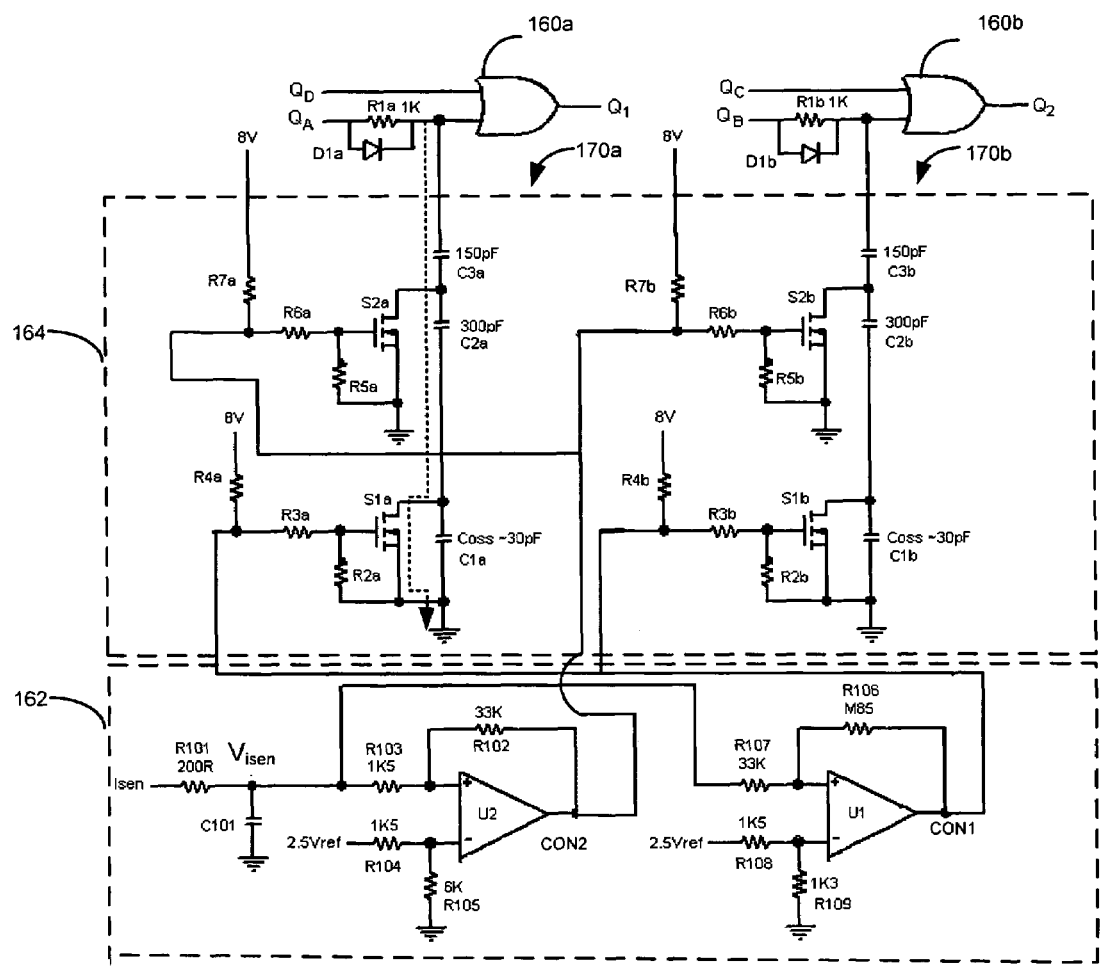
Figure 3D:
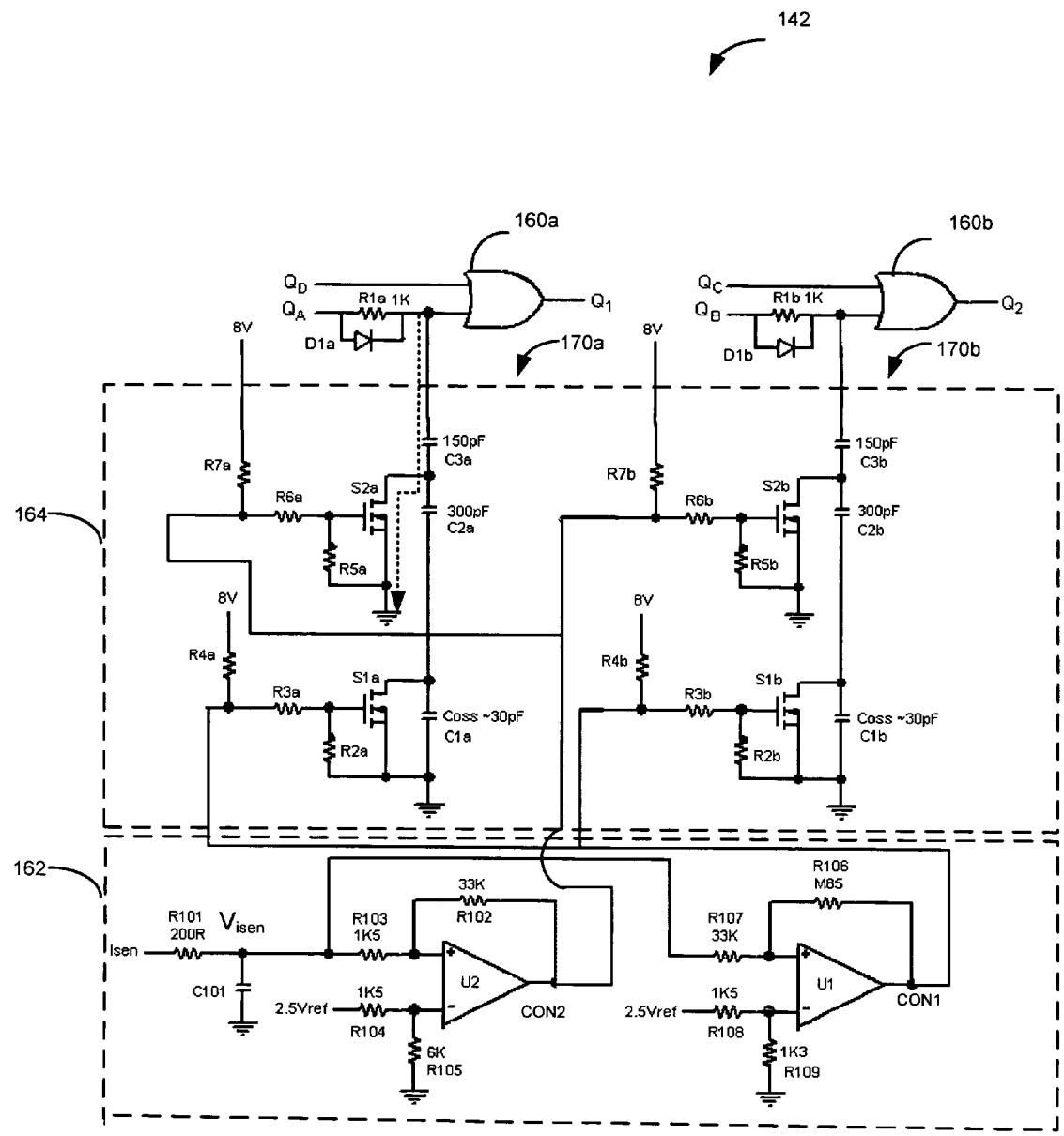

Delay element section 164 generates a delay that depends upon which, if any, of switches S1a, S2a are activated by respective signals CON1 and CON 2. FIGS. 3B-3D depict circuits describing the operation of secondary control circuit 142 based upon the load current signal $I_{SEN}$, which varies in accordance with the load current $I_{LOAD}$. By way of example, $I_{LOAD}$ may fall into one of three regions, a low load region, a mid-load region, or a high load region. The low load region (FIG. 3B) is generally between 0 ampere (A) and 30 A. The mid-load region (FIG. 3C) is generally between 30 A and 65 A. The high load region (FIG. 3D) is generally greater than 65 A. These regions of the load current $I_{LOAD}$ determine the amount of delay introduced prior to switching the synchronous rectifiers FETQ1, FETQ2 to an off state. One skilled in the art will recognize that load currents defining these regions and the number of regions may vary.

Figure 4:
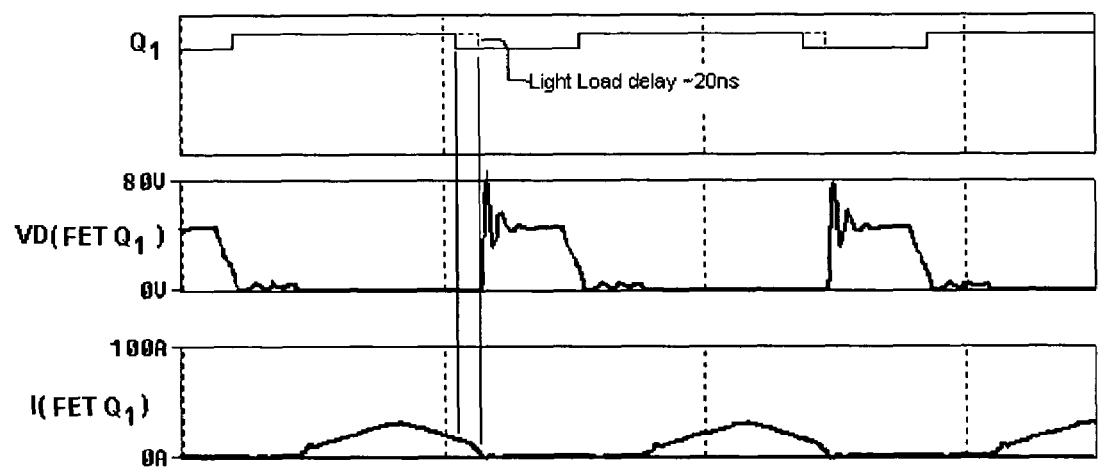
FIG. 4 depicts waveforms describing operation of a portion of a circuit of FIG. 2 for a light load region of load current.

The arrow in FIG. 3B illustrates the circuit path through selected capacitive elements of the delay element circuit 164 when the $I_{LOAD}$ is in the low load region. $V_{ISEN}$ is below the threshold voltage level to turn on comparators U2 and U1. Specifically, the inverting input voltages exceed the non-inverting input voltages, thereby causing the CON1 and CON2 outputs of comparators U1 and U2 to be low. With the output signal CON1 and CON2 low, switches S1a and S2a are off. With switches S1a and S2a off, capacitors C1a, C2a, and C3a form a series connection between the input of first OR gate 160a and ground. This configuration minimizes equivalent capacitance between the input to OR gate 160a and ground, and the corresponding delay. For the circuit of FIG. 3B, the signal to turn FETQ1 to an off state has a delay of about 20 ns when $I_{LOAD}$ is in the low level region. FIG. 4 depicts exemplary waveforms representing such a delay. As stated above, skilled artisans will understand that the capacitance between the drain and source off switch S1a may be implemented using the Coss of FET S1a if the timing requirements meet the design criteria.

Figure 5:
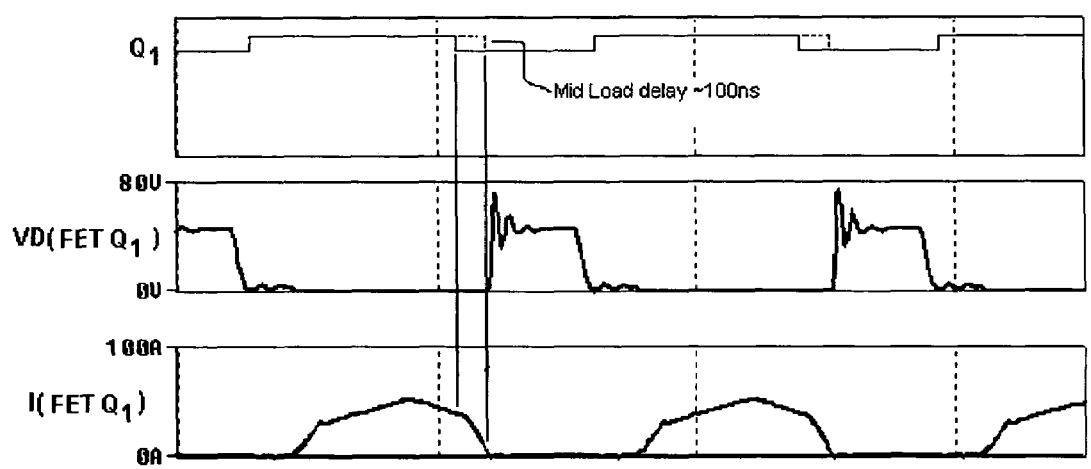
FIG. 5 depicts waveforms describing operation of a portion of a circuit of FIG. 2 for a mid-load region of load current.

FIG. 3C illustrates the circuit path through selected capacitive elements of delay element circuit 164 when $I_{LOAD}$ is in the mid-load region. When $I_{LOAD}$ is in the mid-load region, $V_{ISEN}$ is above the threshold level for comparator U1 to turn on, driving CON1 high. CON1 then turns on the switch S1a, effectively, shorting capacitor C1a and placing capacitors C2a and C3a in series between the input to OR gate 160a and ground. The equivalent series capacitance of C2a and C3a exceeds the equivalent series capacitance of capacitors C1a, C2a and C3a. For the circuit of FIG. 3C, the signal to turn FETQ1 off has a delay of about 100 ns. FIG. 5 depicts exemplary waveforms representing such a delay.

Figure 6:
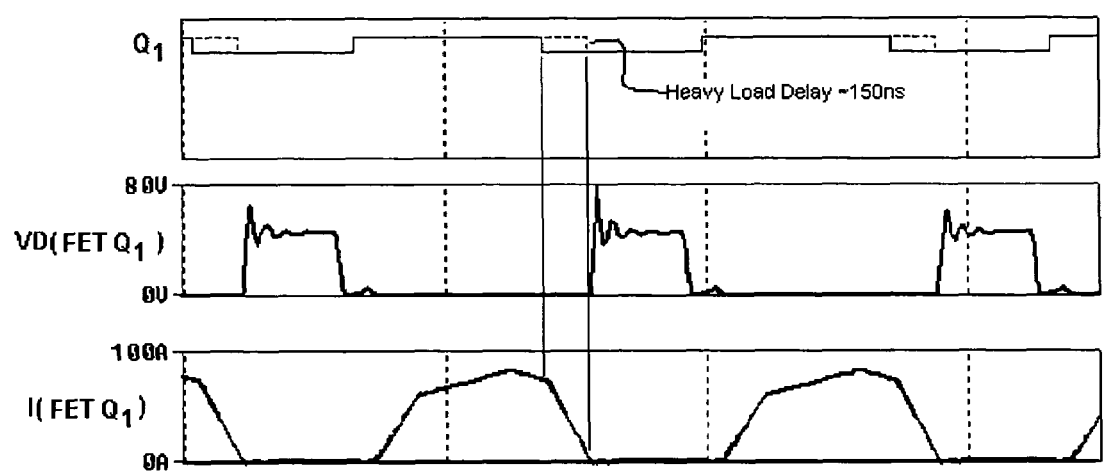
FIG. 6 depicts waveforms describing operation of a portion of a circuit of FIG. 2 for a heavy load region of load current.

FIG. 3D illustrates the circuit path through selected capacitive elements of delay element circuit 164 when $I_{LOAD}$ is in the heavy load region. In this scenario, $V_{ISEN}$ is above the threshold level for comparators U1 and U2 to turn on, thereby driving CON1 and CON2 is high. This activates switches S1a and S2a. Activating switch S1a causes the circuit to operate similarly as described above. Activating switch S2a provides a current path from capacitor C3a, through switch S2a, to ground. This leaves only capacitor C3a between the input to OR gate 160a and ground. The equivalent capacitance of capacitor C3a exceeds the equivalent capacitance of the series connection of capacitors C2a and/or C3a, thereby increasing the delay. For the circuit of FIG. 3D, the signal to turn FETQ1 has a delay of approximately 150 ns. FIG. 6 depicts exemplary waveforms representing such a delay.

From the description of FIGS. 3A-3D, skilled artisans will appreciate that various components of the circuits described herein may have various values. Exemplary values for selected components are provided in the attached figures. One skilled in the art will further appreciate that the values shown in the figures may vary in accordance with various design criteria for implementing the present invention.

Figure 7:
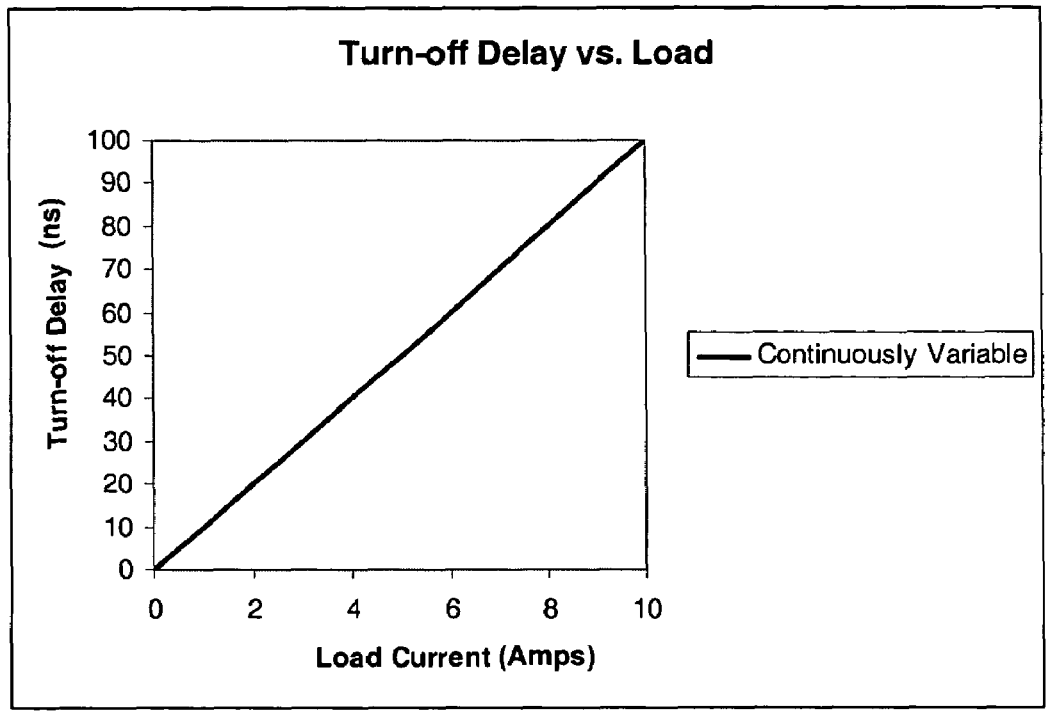
FIG. 7 is a graph illustrating an exemplary turn-off delay for a synchronous rectifier versus load current.

From the embodiments described herein, it will be apparent that the turn-off delay of the synchronous rectifier control increases as the $I_{LOAD}$ increases. Similarly, the turn-off delay of the synchronous rectifier decreases when $I_{LOAD}$ decreases. FIG. 7 shows a graphical example of the linear relationship between the turn-off delay and the $I_{LOAD}$.

Figure 8:
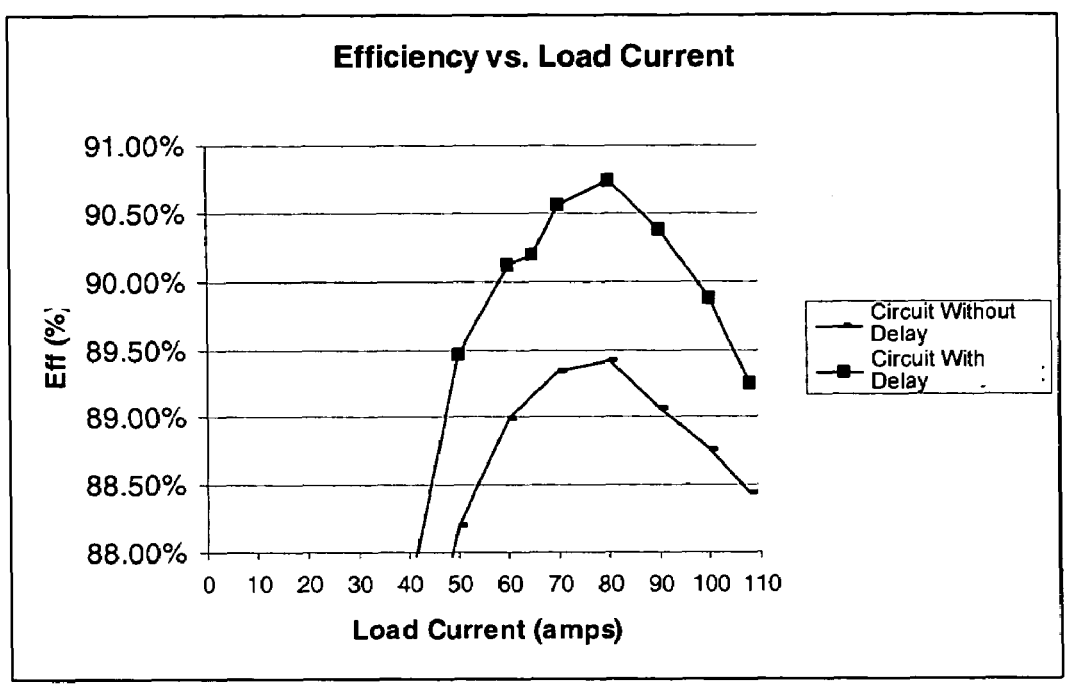
FIG. 8 is a graph illustrating power efficiency versus load for a power converter arranged in accordance with the principles of the present invention.
Figure 9:
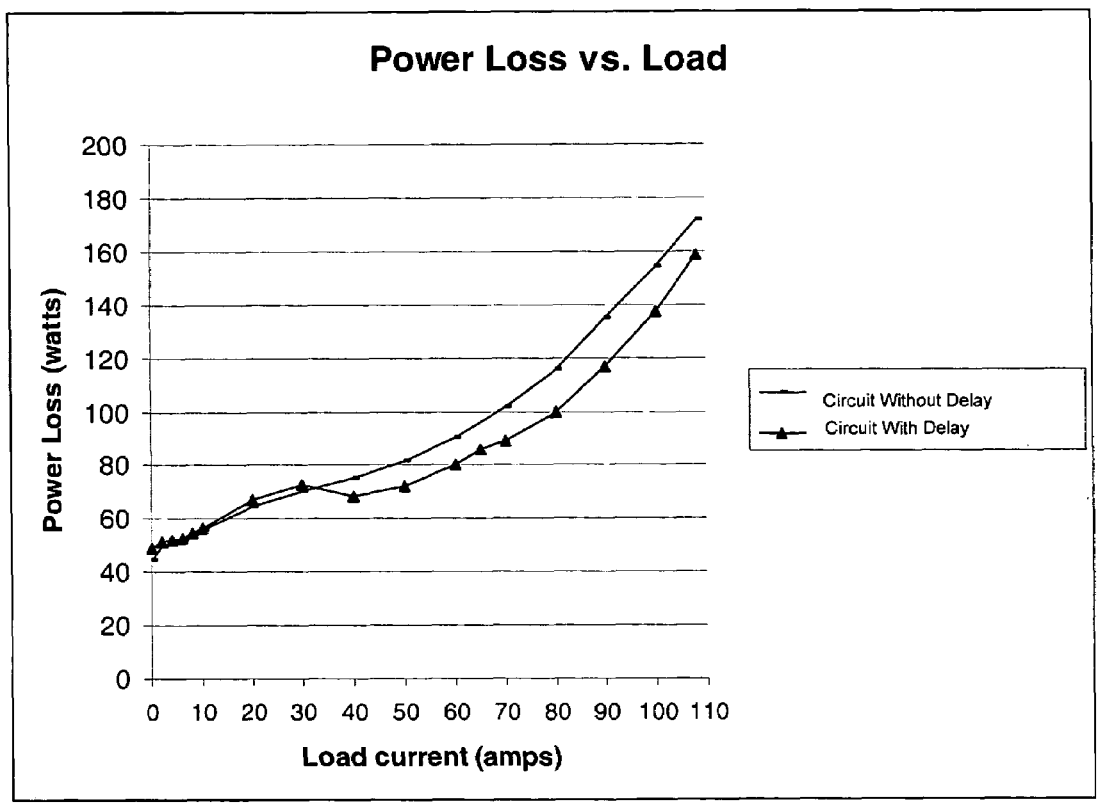
FIG. 9 is a graph illustrating power loss versus load on a power converter.

This process of delaying the signal to turn-off a synchronous rectifier reduces or eliminates the body diode conduction through the synchronous rectifier FETQ1, FETQ2, thereby increasing the efficiency of power converter 100. Referring to FIGS. 8 and 9, the power converter 100 of the present invention increases the efficiency and reduces power loss. The power converter used to generate FIGS. 8 and 9 used a 12V/110 A phase shifted ZVS full bridge power supply operating at 300 kHz. FIGS. 8 and 9 depict curves corresponding to a power converter operating without and with the delay circuit of the present invention.

Figure 10:
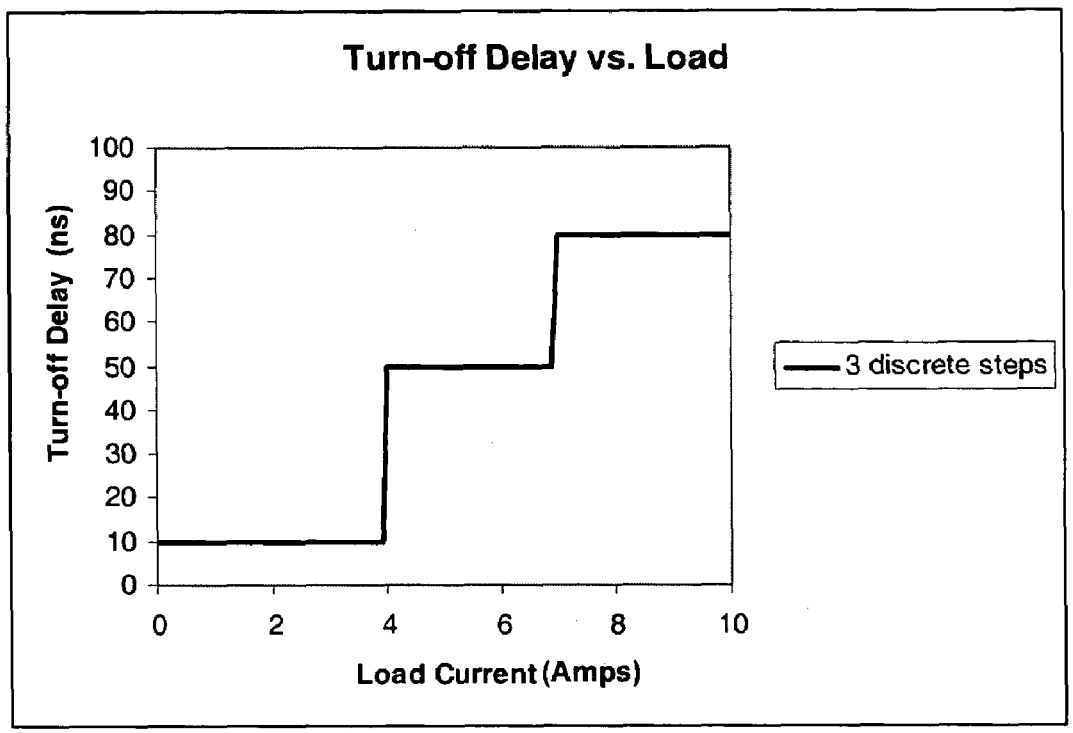
FIG. 10 is a graph illustrating an exemplary turn-off delay for a synchronous rectifier versus load current.

One skilled in the art will recognize that numerous relationships between the load current and turn-off delay exist. FIG. 10 shows a stepped relationship between the turn-off delay and the load current. For example, one skilled in the art will recognize that N discrete steps relating load current regions and turn-off delay may be utilized. In the embodiment of FIGS. 3A-3D, three discrete steps were utilized. One skilled in the art will also recognize that both linear and non-linear relationships between turn-off delay and load current may be implemented.

Figure 11:
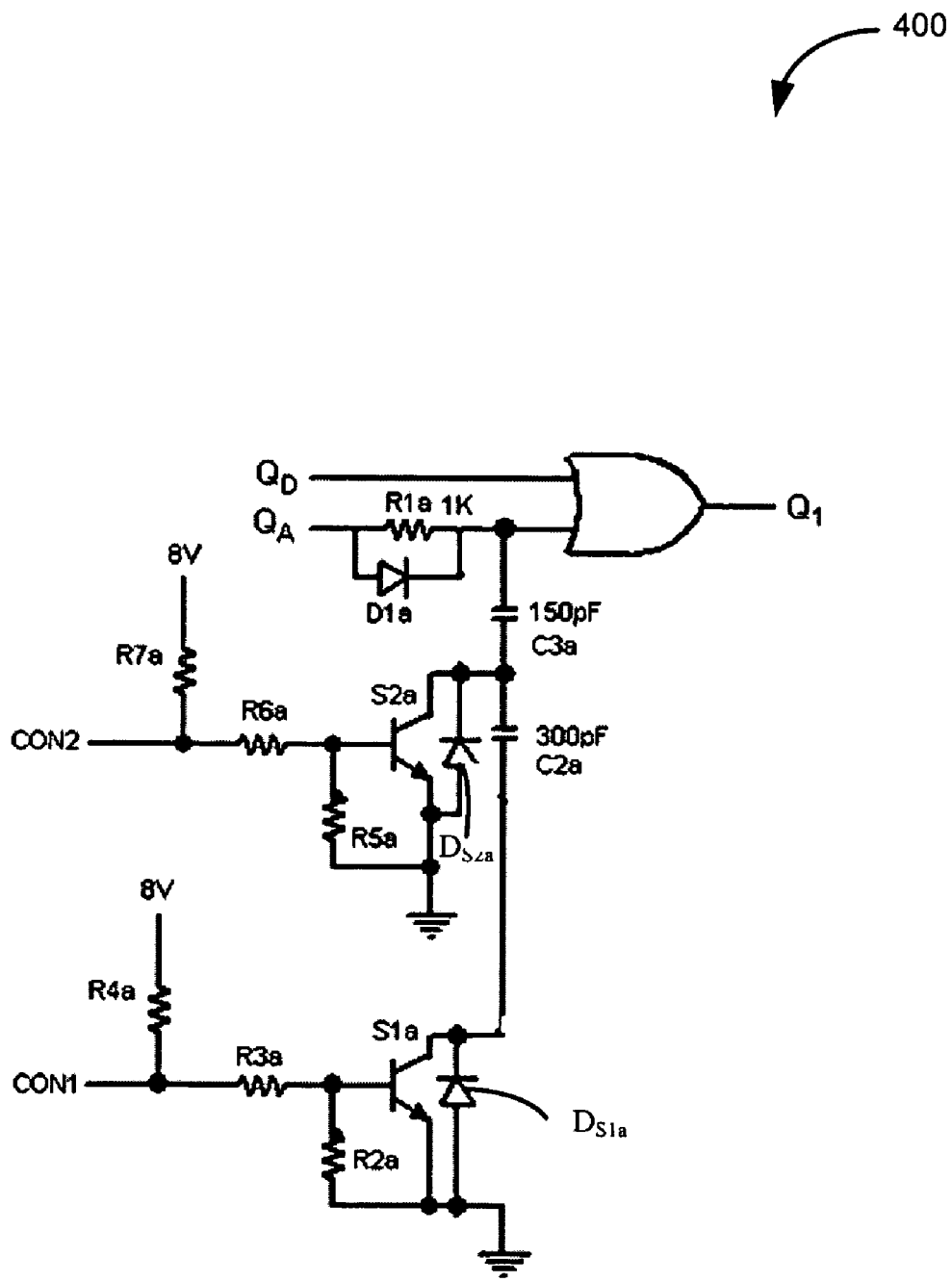
FIG. 11 is a schematic diagram of a delay circuit for synchronous rectification.

FIG. 11 shows an alternate embodiment for generating a delay to turn off a synchronous rectifier. FIG. 11 is a schematic diagram of a control circuit 400 which may be substituted for delay circuits 170a, 170b of delay element section 164 of FIGS. 3A-3D. FIG. 11 utilizes BJTs in place of FETs for switches S1a and S2a. BJTs provide a relatively low output capacitance compared to the FETs. BJTs thus provide a delay that more closely attains zero current in the body diode of the synchronous rectifiers FETQ1 and FETQ2. In the configuration of FIG. 11, freewheeling diodes DS1a and DS2a provide a discharge path for the capacitors C2a and C3a.

FIG. 12 depicts a diagram of a current sensing circuit 200 used to sense $I_{LOAD}$ and generate $I_{SEN}$. Current sensing circuit 200 is implemented as a half-wave capacitive-filter rectifier having an output connected to a buffer amplifier. A current transformer 190 is arranged to sense the load current $I_{PRI}$ at the primary side. The secondary winding of transformer 190 connects to a diode 194 and load resistor 196. A filter capacitor 198 in parallel with resistor 196 provides filtering of the rectified signal. Buffer amplifier 192 outputs the sense signal $I_{SEN}$ to the input of delay selection section 162 of FIGS. 3A-3D. Resistor R101 and capacitor C101 cooperate to provide a low pass filter function for $I_{SEN}$.

While the invention has been described in its presently preferred form, it will be understood that the invention is capable of modification without departing from the spirit of the invention as set forth in the appended claims.

What is claimed is:

1. A circuit comprising:
   a secondary controller;
   a delay circuit coupled to the secondary controller, the delay circuit operable to receive a first synchronous rectifier control signal from the secondary controller and a load current signal, the delay circuit applying a predetermined delay to the first synchronous rectifier control signal; and
   a synchronous rectifier control circuit coupled to the secondary controller and to the delay circuit, the synchronous rectifier control circuit operable to receive the delayed first synchronous rectifier control signal and control a synchronous rectifier in accordance with the first synchronous rectifier control signal, wherein the delay applied to the first synchronous rectifier control signal varies in accordance with the load current signal.

2. The circuit of claim 1, wherein the synchronous rectifier control circuit receives a second synchronous rectifier control signal.

3. The circuit of claim 1, further comprising a delay selector circuit coupled to the delay circuit, the delay selector circuit operable to select a predetermined delay in the delay circuit.

4. The circuit of claim 1 wherein the load signal has a value in one of a low range, a mid-range, and a high range.

5. The circuit of claim 4 wherein the low range is from 0 A to about 30 A.

6. The circuit of claim 4 wherein the mid-range is from about 30 A to about 65 A.

7. The circuit of claim 4 wherein the high range is greater than 65 A.

* * * * *